United States Patent [19]

Wallach, Jr. et al.

[11] Patent Number: 4,661,903
[45] Date of Patent: Apr. 28, 1987

[54] DIGITAL DATA PROCESSING SYSTEM INCORPORATING APPARATUS FOR RESOLVING NAMES

[75] Inventors: Walter A. Wallach, Jr., Raleigh; Michael S. Richmond, Pittsboro, both of N.C.; John K. Ahlstrom, Mountain View, Calif.; David H. Bernstein, Ashland; Richard G. Bratt, Wayland, both of Mass.

[73] Assignee: Data General Corporation, Westboro, Mass.

[21] Appl. No.: 647,271

[22] Filed: Sep. 4, 1984

Related U.S. Application Data

[63] Continuation of Ser. No. 266,429, May 22, 1981, abandoned.

[51] Int. Cl.[4] .............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,588,829 | 6/1971 | Boland et al. | 364/200 |
| 3,789,365 | 4/1974 | Jen et al. | 364/200 |
| 3,825,904 | 7/1974 | Burk et al. | 364/200 |
| 3,902,164 | 8/1975 | Kelley | 364/200 |
| 4,079,453 | 3/1978 | Dahl | 364/200 |
| 4,084,224 | 4/1978 | Appell et al. | 364/200 |
| 4,155,119 | 5/1979 | DeWard | 364/200 |
| 4,159,536 | 6/1979 | Kehoe et al. | 364/900 |
| 4,325,120 | 4/1982 | Colley et al. | 364/200 |
| 4,332,010 | 5/1982 | Messina et al. | 364/200 |

Primary Examiner—David Y. Eng
Attorney, Agent, or Firm—Robert F. O'Connell

[57] ABSTRACT

Apparatus in a digital computer system for obtaining descriptors of data from names representing the data. The digital computer system executes sequences of instructions. Names representing data processed during execution of an instruction sequence are associated with the instruction sequence. Each name associated with the instruction sequence corresponds to a name table entry associated with the instruction sequence. The operation of resolving a name, i.e., obtaining the descriptor for the data represented by the name, is performed by name processing apparatus in processors of the data processing system. In response to a name, the name processing apparatus locates the name table entry corresponding to the name obtains the descriptor for the item represented by the name using the information in the name table entry corresponding to the name. In a present embodiment, the descriptor specifies the address and length of a data item. The information in the name table entry specifies the address of the represented item by specifying a base address and a displacement and further specifies the length and type of the represented item.

21 Claims, 1 Drawing Figure

DIGITAL DATA PROCESSING SYSTEM INCORPORATING APPARATUS FOR RESOLVING NAMES

CROSS REFERENCE TO RELATED APPLICATIONS

This application is a continuation of application Ser. No. 266,429, filed May 22, 1981, now abandoned.

The present patent application is related to U.S. patent application Ser. No. 06/266,533 filed on even date with the present application and assigned to the assignee of the present application.

BACKGROUND OF THE INVENTION

1. Field of the Invention

The present invention relates to a digital data processing system and, more particularly, to a multiprocess digital data processing system suitable for use in a data processing network and having a simplified, flexible user interface and flexible, multileveled internal mechanisms.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the use is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior procesor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another use or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently retranslated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to efficiently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the system's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates generally to digital computer systems and more specifically to apparatus for deriving the addresses of data items to be processed by the computer system from items called names which represent the items to be processed. In the present invention, names are associated with sequences of instructions. Each name corresponds to a name table entry which is associated with the same sequence of instructions as the name. Information in the corresponding name table entry specifies the address of the data represented by the name. Processors in the computer system of the present invention include name processing apparatus which resolves a name into the address of the data item represented by the name. The name is resolved by using the information in the name table entry corresponding to the name to determine the address of the data item represented by the name.

It is thus an object of the present invention to provide an improved digital data processing system.

It is another object of the present invention to provide improved apparatus for obtaining the address of data processed by a digital data processing system.

It is a further object of the present invention to provide improved representations of data items in instructions.

It is yet another object of the present invention to provide apparatus for resolving names representing data items to be processed by a digtal data processing system.

Other objects, advantages and features of the present invention will be understood by those of ordinary skill in the art, after referring to the following detailed description of the preferred embodiments and drawings wherein:

Figure 1:
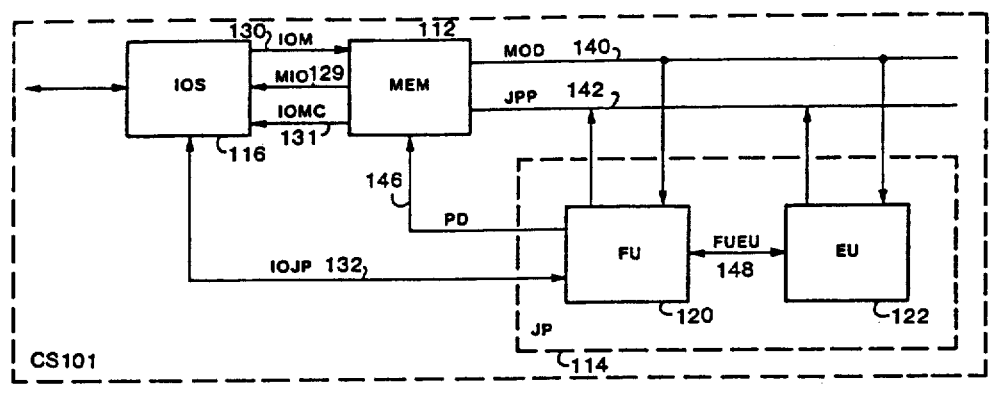
FIG. 1 is a partial block diagram of a computer system incorporating the present invention.

This application incorporates by reference the entire application, Ser. No. 266,402, filed on May 22, 1981, of Baxter et al., now issued as U.S. Pat. No. 4,455,602, on June 19, 1984.

What is claimed is:

1. In a digital computer system including
(A) memory means for performing memory operations including storing data items including instructions and instruction sequences containing instructions, said intructions containing names permanently associated with instruction sequences, and
   said memory means including means for storing a plurality of name table entries corresponding to said instruction sequences, said name table entries each containing information for determining the address of the data item represented by the name to which the name table entry corresponds,
   said memory operations further including providing data items in response to memory operation specifiers, ech memory operation specifier specifying a memory operation and an address of a data item in said memory means, and
(B) processor means connected to said memory means for processing said data items and providing said memory operation specifiers in response to said instructions,
   said processor means including name interpretation means for providing addresses of data items associated with instruction sequences to be processed by said processor means, said name interpretation means comprising:
   means responsive to a name in an instruction of an instruction sequence for determining the name table entry associated with said name in the plurality of name table entries associated with said instruction sequence, each of said names associated with a given one of said instruction sequences having a correponding name table entry in the name table entries associated with said given instruction sequence, and each said corresponding name table entry containing information for determining the address of the data item represented by the name to which said name table entry corresponds; and
   name processing means responsive to the information in the name table entry associated with the sequence of instructions containing the instruction currently being executed by said processor means for resolving said information to produce the address of the data item specified by the corresponding name table entry.

2. In a digital computer system of claim 1 wherein said corresponding name table entry further specifies a length of the data item represented by the name to which said name table entry corresponds.

3. In a digital computer system of claim 2 wherein said memory operation specifier further specifies the length of the data item at the address specified in said memory operation specifier.

4. In a digital computer system of claim 2 wherein said corresponding name table entry further specifies a type of the data item represented by the name to which the data item represented by the name to which the name table entry corresponds.

5. In a digital computer system of claim 1 wherein said corresponding name table entry further specifies a type of the data item represented by the name to which the name table entry corresponds.

6. In a digital computer system of claim 1 wherein said name processing means resolves the information in the name table entry corresponding to said name by producing a base address of the data item represented by said name using said corresponding name table entry and a displacement from said base address to form the address of said data item.

7. In a digital computer system of claim 1 wherein
said processing means further includes
cache means for storing addresses of selected data items, and
said name processing means resolves the information into name table entry by providing from said cache means the stored address of the data item represented by said name if said stored address is present in said cache means and otherwise providing the address of said represented data item from said main memory means and loading the address of said represented date item from said main memory means into said cache means.

8. In a digital computer system of claim 1 wherein
said instructions contain operation codes for controlling said processor means; and
said name processing means resolves the information in the name table entries associated with the names in said instructions under control of the operation codes in said instructions.

9. In a digital computer system of claim 1 wherein
each said name table entry further contains flags specifying how the name processing means is to provide the address of said represented item from the information contained in said name table entry;

certain ones of said name table entries include another name associated with the instruction sequence with which the name to be resolved is associated; and said name processing means resolves said another name under control of said flags when resolving any name to which one of said certain name table entries corresponds.

10. In a digital computer system of claim 1 wherein said name processing means further evaluates the information in a name table entry by resolving said information therein to produce the address of the names associated with said name table entry and then using said address to form a memory operation specifier to which said memory means responds by providing the data item represented by said name to said processor means.

11. In a digital computer system of claim 10 wherein said instructions contain operation codes for controlling said processor means; and further wherein said name processing means resolves or evaluates the information in the name table entries associated with the names in said instructions under control of the operation codes in said instructions.

12. In a digital computer system of claim 10 wherein each name table entry further contains flags specifying how said name processing means is to obtain the address of said represented data item from the information contained in said name table entry and certain name table entries include another name associated with the instruction sequence with which the name to be resolved is associated; and said name processing means evaluates said another name under control of said flags when said name processing means is resolving any name to which one of said certain name table entries corresponds.

13. In a digital computer system of claim 1 wherein said memory means further includes means for storing name table pointers representing the addresses of name tables containing name table entries associated with given instruction sequences, a given instruction sequence being associated with a given name table pointer and each name associated with a given instruction sequence contains an index value specifying the corresponding name table entry in the name table associated with said instruction sequence; and said name processing means obtains the address of the name table entry in the name table corresponding to the name to be resolved by using the index value in said name to produce a displacement of the address of said name table entry and adding said displacement to the address represented by said name table pointer.

14. In a digital computer system of claim 1 wherein a name table entry includes (A) a base specifier specifying a base address of the address of the data item represented by the name associated with said name table entry and (B) a displacement specifier specifying a displacement from said base address; and said name processing means produces the address of said represented data item by producing the base address specified by said base specifier, producing the displacement specified by said displacement specifier, and adding said displacement to said base address.

15. In a digital computer system of claim 14 wherein said memory means includes means for storing base pointers, each of said base pointers representing an address, an execution of an instruction sequence by said processor means providing a plurality of base pointers and an instruction of one instruction sequence specifying a base specifier identifying one of said base pointers, and the address represented by said identified base pointer being said base address.

16. In a digital computer system of claim 15 wherein each of said plurality of base pointers is associated with a base pointer code, and said base specifier specifies a base pointer by means of said base pointer code.

17. In a digital computer system of claim 16 wherein said processor means performs a call operation suspending the current execution of an instruction sequence and commencing a new execution of another instruction sequence and further performs a return operation resuming the execution of the suspended instruction sequence to begin the new current execution in which said return operation occurs; and further wherein the base pointers associated with certain base pointer codes thereby change as a result of said call and return operations; and further wherein said call operation saves the addresses represented by the base pointers associated with said certain base pointer codes and obtains the addresses represented by the base pointers associated with said certain base pointer codes for the execution being commences; and said return operation restores said saved addresses for the execution being resumed.

18. In a digital computer operation of claim 15 wherein said name processing means further includes base register means for storing addresses represented by the base pointers corresponding to said certain base pointer codes; and said name processing means obtains said base address from said base register means when said base specifier is one of said certain base pointer codes.

19. In a digital computer system of claim 18 wherein said processor means performs a call operation suspending the current execution of an instruction sequence and commencing a new execution of another instruction sequence and further performs a return operation resuming the execution of the suspended instruction sequence to begin the new current execution in which said return operation occurs;

said call operation saves the addresses stored in said base register means for the execution being suspended and loads the addresses represented by the base pointers associated with the certain base pointer codes for the execution being commenced into said base register means; and said return operation reloads the saved addresses for the execution being resumed into said base register means.

20. In a digital computer system of claim 1 wherein said corresponding name table entry further contains a length name specifying the length of the data item represented by the name to which said corresponding name table entry corresponds:

said name processing means further evaluating said name table entry by resolving said name table entry to produce an address of the data item represented by a name to form a memory operation specifier to which said memory means responds by providing the represented date item to said processor means; and said name processing means further producing the length of said represented data item by evaluating said length name.

21. In a digital computer system of claim 1 wherein said data items include array items containing a plurality of element items and said name table entries include array name table entries corresponding to names representing individual ones of said element items, each of said array name table entries including an index name representing an index item specifying the individual element item currently represented by said corresponding name;

said name processing means further evaluating the name table entry associated with a said name by resolving said name table entry to produce an address of a data item represented by said name to form a memory operation specifier to which said memory means responds by providing the represented data item to said processor means; and said name processing means further receiving said index name and evaluating said index name to obtain said index item and using said index item to produce the address of one individual element item currently represented by said corresponding name.

* * * * *